(12) United States Patent
Wright et al.

(10) Patent No.: US 9,530,426 B1
(45) Date of Patent: Dec. 27, 2016

(54) FILTERING SOUNDS FOR CONFERENCING APPLICATIONS

(71) Applicant: MICROSOFT TECHNOLOGY LICENSING, LLC, Redmond, WA (US)

(72) Inventors: Shawn Crispin Wright, Sammamish, WA (US); Dan Osborn, Woodinville, WA (US); Joe Thompson, Seattle, WA (US); Hongwu Huai, San Bruno, CA (US); Forest Woodcroft Gouin, Seattle, WA (US); Megan Saunders, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/749,446

(22) Filed: Jun. 24, 2015

(51) Int. Cl.
*H03G 3/20* (2006.01)
*G10L 21/02* (2013.01)
(Continued)

(52) U.S. Cl.
CPC ......... *G10L 21/0205* (2013.01); *H04R 29/005* (2013.01); *H04R 29/008* (2013.01); *G10L 2021/02082* (2013.01); *G10L 2021/02166* (2013.01); *H04R 2410/01* (2013.01); *H04R 2430/21* (2013.01)

(58) Field of Classification Search
CPC .................. G10L 21/0205; G10L 2021/02082; H04R 29/005; H04R 29/008; H04R 2410/01
See application file for complete search history.

(56) References Cited

U.S. PATENT DOCUMENTS

| 4,658,425 A | 4/1987 | Julstrom |
| 4,862,278 A | 8/1989 | Dann et al. |

(Continued)

FOREIGN PATENT DOCUMENTS

| CN | 203537386 U | 4/2014 |
| EP | 2747424 A1 | 6/2014 |

(Continued)

OTHER PUBLICATIONS

"ZoomLink+ User Guide", Published on: Aug. 13, 2014, Availavble at: http://www.phonak.com/content/dam/phonak/b2b/C_M_tools/FM/Transmitters/Brochures/User_Guide_ZoomLinkPlus_029-0223.pdf.

(Continued)

*Primary Examiner* — Simon Sing
(74) *Attorney, Agent, or Firm* — Brianna Hinojosa; Judy Yee; Micky Minhas

(57) ABSTRACT

A conferencing system includes a near-eye display device that displays video received from a remote communication device of a communication partner. An audio stream is transmitted to the remote communication device. The audio stream includes real-world sounds produced by one or more real-world audio sources captured by a spatially-diverse microphone array and virtual sounds produced by one or more virtual audio sources. A relative volume of background sounds in the audio stream is selectively reduced based, at least in part, on real-world positioning of corresponding audio sources, including real-world and/or virtualized audio sources.

20 Claims, 5 Drawing Sheets

(51) Int. Cl.
*H04R 29/00* (2006.01)
*G10L 21/0216* (2013.01)
*G10L 21/0208* (2013.01)

(56) References Cited

U.S. PATENT DOCUMENTS

| | | | |
|---|---|---|---|
| 5,335,011 | A | 8/1994 | Addeo et al. |
| 6,125,175 | A | 9/2000 | Goldberg et al. |
| 6,681,023 | B1 | 1/2004 | Turnbull et al. |
| 7,184,559 | B2 | 2/2007 | Jouppi |
| 8,140,325 | B2 | 3/2012 | Kanevsky et al. |
| 8,441,515 | B2 | 5/2013 | Yam |
| 8,749,609 | B2 | 6/2014 | Ryu et al. |
| 2003/0081115 | A1 | 5/2003 | Curry et al. |
| 2010/0266133 | A1* | 10/2010 | Nakano .............. H04R 3/04 381/17 |
| 2011/0164141 | A1 | 7/2011 | Tico et al. |
| 2011/0181497 | A1* | 7/2011 | Raviv .............. A63F 13/26 345/8 |
| 2011/0228764 | A1* | 9/2011 | Jorgensen ............ A63F 13/00 370/352 |
| 2012/0250869 | A1* | 10/2012 | Ohashi .............. H04R 5/04 381/17 |
| 2013/0041648 | A1 | 2/2013 | Osman |
| 2013/0141421 | A1 | 6/2013 | Mount et al. |
| 2013/0142342 | A1* | 6/2013 | Del Galdo .......... H04R 3/005 381/56 |
| 2013/0236040 | A1* | 9/2013 | Crawford ........... H04S 7/304 381/310 |
| 2013/0259243 | A1* | 10/2013 | Herre .............. G10L 19/02 381/57 |
| 2014/0006026 | A1* | 1/2014 | Lamb .............. H03G 3/10 704/246 |
| 2014/0029761 | A1 | 1/2014 | Maenpaa et al. |
| 2014/0058662 | A1* | 2/2014 | Tachibana .......... G01C 21/00 701/428 |
| 2014/0112505 | A1* | 4/2014 | Osada .............. H04R 5/02 381/303 |
| 2014/0321680 | A1* | 10/2014 | Takahashi .......... H04S 7/304 381/303 |
| 2014/0375531 | A1* | 12/2014 | Latypov ............ G02B 27/0172 345/8 |

FOREIGN PATENT DOCUMENTS

| | | |
|---|---|---|
| WO | 9733450 A1 | 9/1997 |
| WO | 2006121896 A2 | 11/2006 |
| WO | 2010149823 A1 | 12/2010 |
| WO | 2013049248 A2 | 4/2013 |

OTHER PUBLICATIONS

"Dual Voice Tracker User Guide", Retrieved on: Mar. 20, 2015, Availavble at: http://www.soniclear.com/Literature/VoiceTrackerDualUserGuide.pdf.

"OS X Yosemite: Adjust your computer's Sound Input Settings", Retrieved on: Mar. 20, 2015, Available at: https://support.apple.com/kb/PH18961?locale=en_US.

ISA European Patent Office, International Search Report and Written Opinion Issued in Application No. PCT/US2016/036115, Sep. 14, 2016, WIPO, 15 pages.

\* cited by examiner

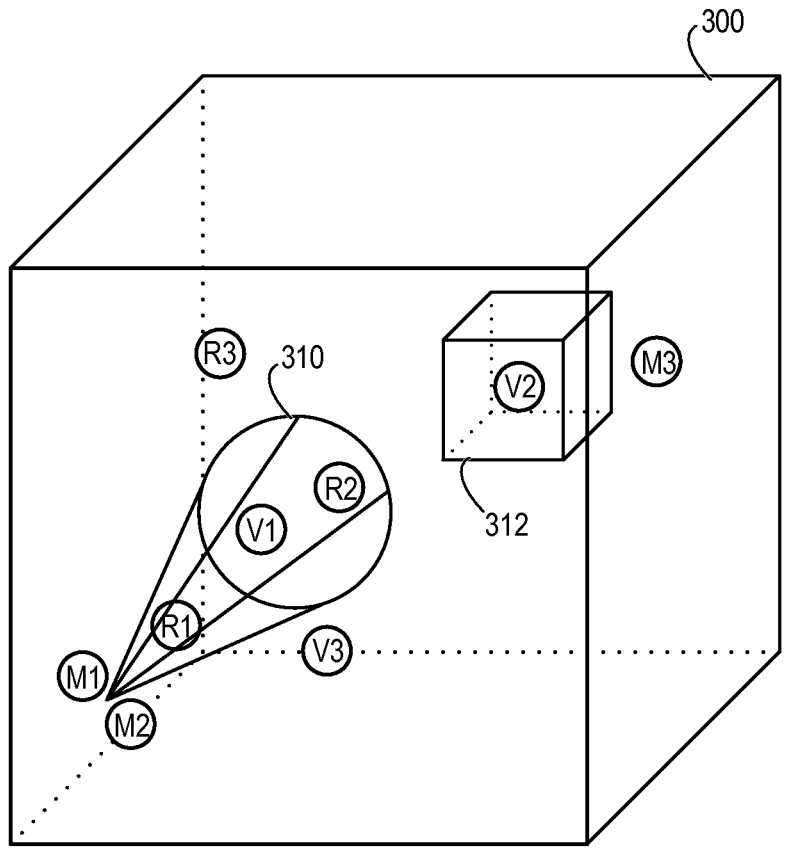
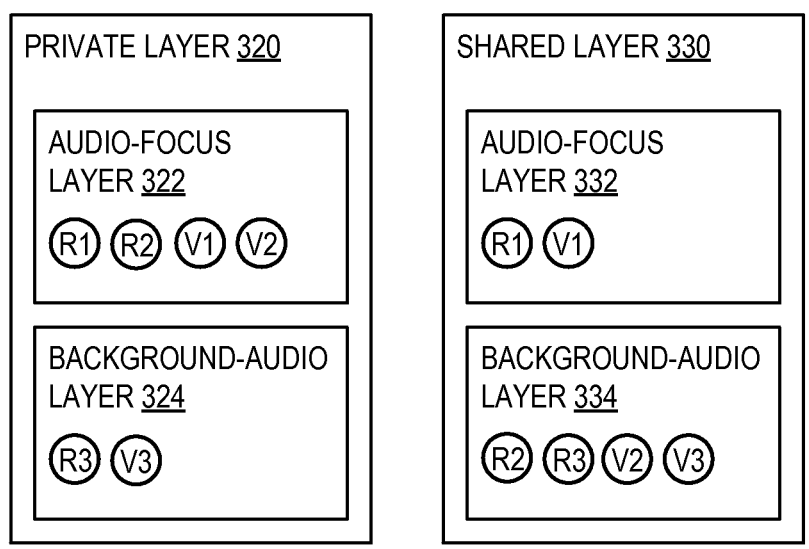
FIG. 3

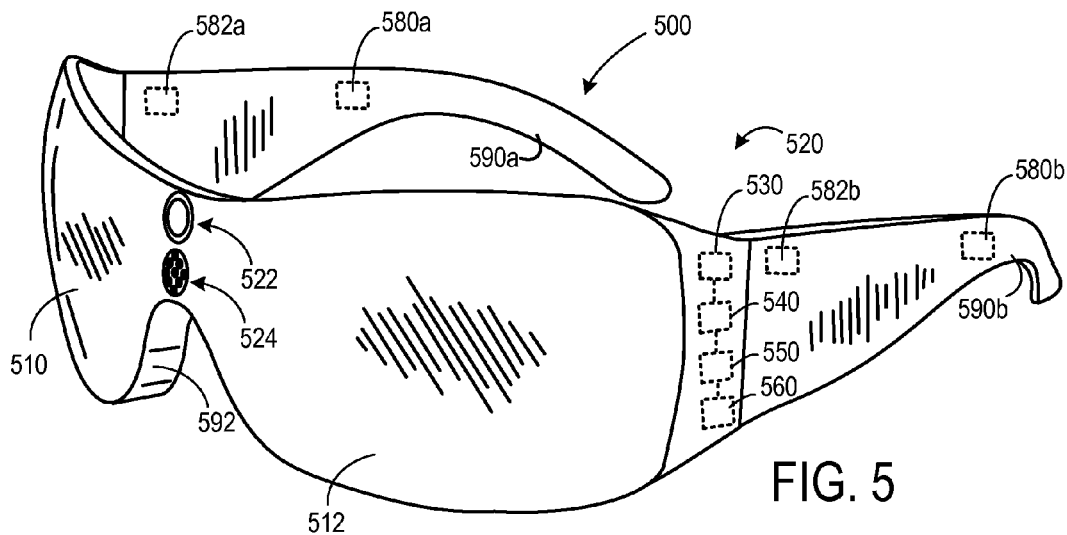
FIG. 5
FIG. 6
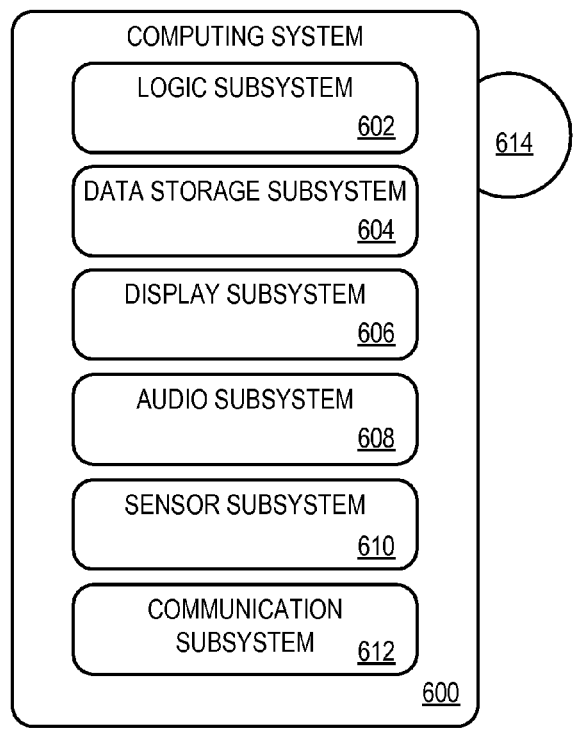

FILTERING SOUNDS FOR CONFERENCING APPLICATIONS

BACKGROUND

Modern communication networks enable two or more people to communicate with each other in real-time by sharing audio and/or video streams. Noise cancellation may be used to filter far-field noise from audio streams captured by a microphone or to remove echo or feedback produced by the presence of audio speakers to emphasize near-field sounds, such as a person's voice.

BRIEF DESCRIPTION OF THE DRAWINGS

FIG. 3 schematically depicts an example three-dimensional physical space containing microphones, real-world audio sources, and virtual audio sources.

FIG. 5 depicts an example near-eye display device.

FIG. 6 depicts an example computing system.

DETAILED DESCRIPTION

Figure 1:
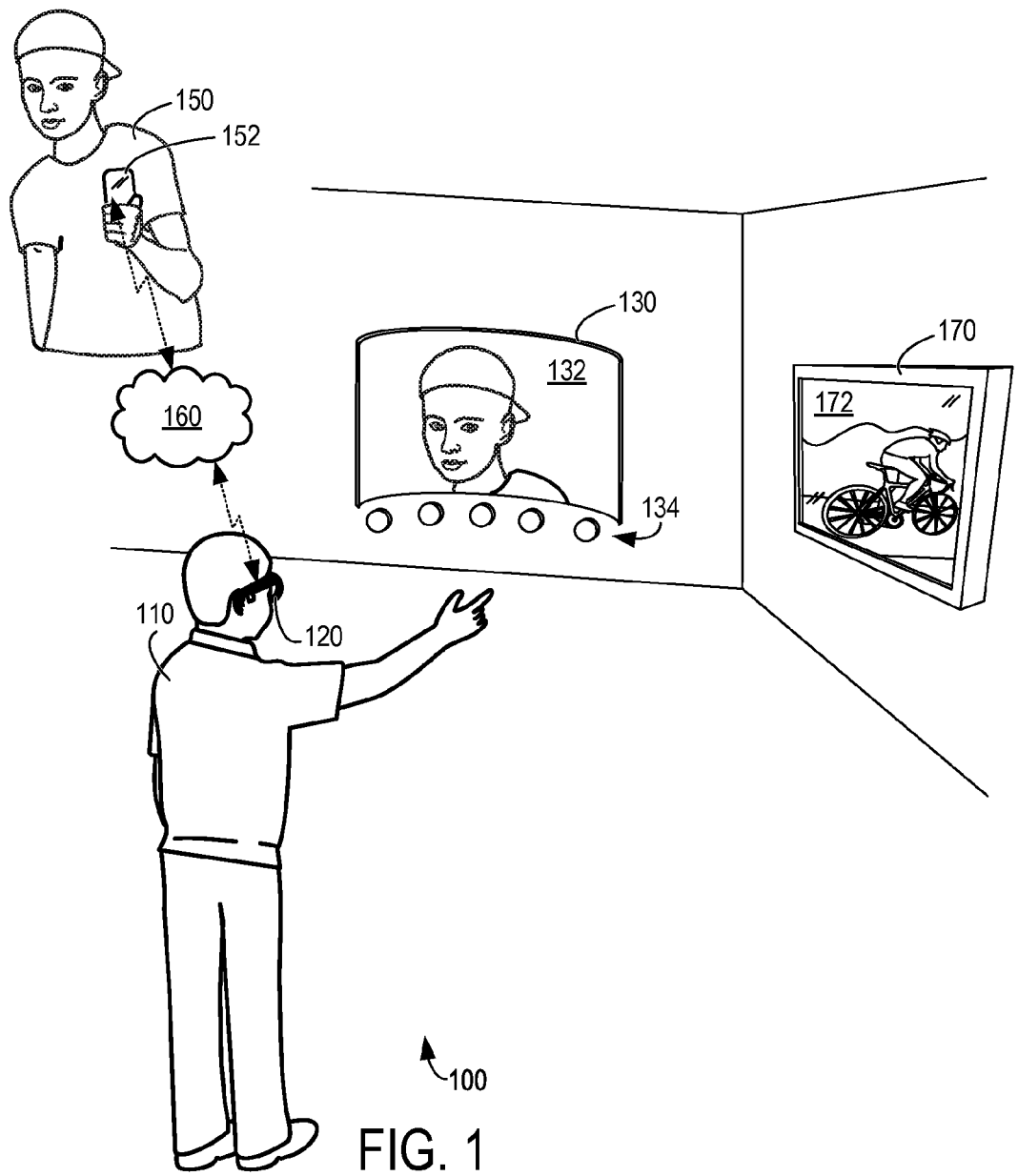
FIG. 1 depicts an example conferencing system in which a user is communicating with a communication partner via a communication device.

FIG. 1 depicts an example conferencing system 100 in which a user 110 communicates with a communication partner 150 via a communication device 120. In this example, communication device 120 takes the form of a near-eye display device. A near-eye display device may include an augmented reality display or a virtual reality display. Communication partner 150 communicates with user 110 by way of a remote communication device 152, in this case, a smart phone. Communication devices 120, 152 may take a variety of forms, such as a smartphone, laptop computer, desktop computer, video phone, etc. Within the context of audio conferencing, these communication devices include at least one audio microphone. These communication devices may further include a camera within the context of audio/video conferencing.

Audio and/or video streams may be transmitted to and received from communications devices, such as communication device 120 and remote communication device 152 to facilitate audio/video communication between two or more users. In this example, communication device 120 displays computer-generated graphical content to user 110 via right and left near-eye displays. A near-eye display may take the form of a see-through near-eye display that enables a user to view a physical space of a real-world environment through the see-through near-eye display. In another implementation, a camera view of a physical space may be displayed via a near-eye display along with overlaid graphical content. In this context, display device 120 may be referred to as an augmented reality device.

Graphical content may be displayed by near-eye display device 120 to provide the appearance of virtual objects being physically present within the physical space. FIG. 1 depicts an example of graphical content that may be displayed to user 110 via right and left near-eye displays. In this example, the graphical content provides the appearance of a virtual monitor 130 upon which a video stream of communication partner 150 is presented at 132. Virtual monitor 130 may be presented alongside physical objects such as a physical, real-world monitor 170 physically displaying graphical content 172. Other examples of virtual objects are depicted in FIG. 1, including virtual buttons 134 for controlling operation of virtual monitor 132 or other aspects of conferencing system 100.

Communication device 120 may present an audio stream of communication partner 150 to user 110 via one or more audio speakers or other sound transducers of communication device 120 and/or via peripheral sound transducers. Virtual sounds produced by virtual audio sources also may be presented to user 110 via communication device 120 and/or peripheral sound transducers. In an example, the audio stream of communication partner 150 may be presented as a virtual sound produced by a virtual audio source having a virtualized real-world position at virtual monitor 130 so that the user perceives the virtual sound as being produced by virtual monitor 130. Sound directionality may be achieved using any suitable audio processing, including application of a head-related transfer function and cross-talk cancelation.

Real-world sounds produced by real-world objects within the physical space may be heard directly by the user's natural hearing. For example, user 110 may hear real-world sounds produced by real-world monitor 170 by way of natural hearing. Real-world sounds may be augmented by amplifying or dampening the real-world sounds within an audio stream presented to user 110 via one or more audio speakers of communication device 120 (e.g., via sound reproduction and/or noise cancelling). Virtual sounds and real-world sounds may be combined into an audio stream presented to user 110 via one or more audio speakers of communication device 120. Virtual sounds and real-world sounds may be amplified or dampened relative to each other to provide a desired balance in the audio presentation to user 110.

Real-world sounds within the physical space of user 110 may be captured via a microphone and transmitted to remote communication device 152 for presentation to communication partner 150. In this example, real-world sounds may include a voice of user 110 and/or sounds produced by real-world monitor 170. In some examples, certain real-world sounds may be amplified or dampened within the audio stream transmitted from communication device 120 to remote communication device 152. For example, far-field sounds produced by real-world monitor 170 may be filtered from the audio stream while near-field sounds such as the voice of user 110 may be included or amplified within the audio stream transmitted to the remote communication device.

Additionally or alternatively, virtual sounds produced by virtual audio sources having a virtualized real-world position within the physical space of user 110 may be included within the audio stream transmitted to remote communication device 152. Virtual sounds and real-world sounds may be amplified or dampened relative to each other to provide a desired balance in the audio presentation at communication device 152. User 110 may further control which sounds are shared with communication partner 150 or presented to user 110 via communication device 120 by amplifying or dampening real-world sounds and/or virtual sounds. In an example, individual audio sources, real or virtual, may be individually selectable by user 110 to include, omit, increase, or reduce their presence within an audio stream. In another example, one or more audio-inclusion regions may be established, and real and/or virtual objects positioned within the audio-inclusion region will be included while real and/or virtual objects positioned outside the audio-inclusion region will be excluded. In another example, one or more audio-exclusion regions may be established, and real and/or virtual objects positioned within the audio-exclusion region will be excluded while real and/or virtual objects positioned outside the audio-exclusion region will be included. In still another example, a combination of individual sound selection, audio-inclusion region(s), and audio-exclusion region (s) may be used.

Figure 2:
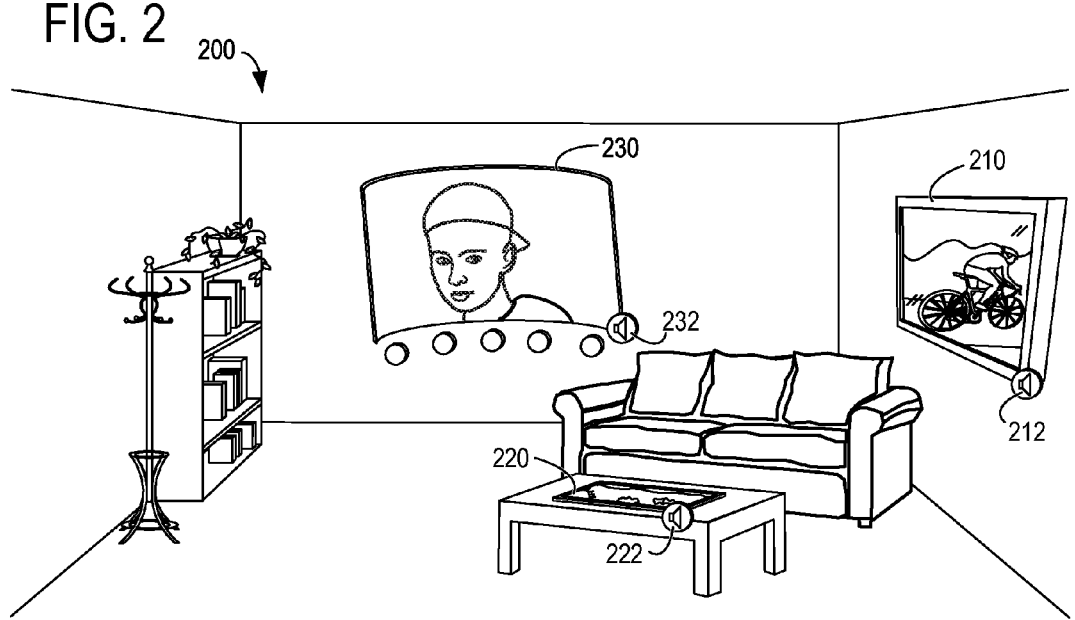
FIG. 2 depicts an example augmented reality view of a physical space containing both real-world and virtual objects.

FIG. 2 depicts an example augmented reality view of a physical space 200 containing both real-world and virtual objects. As previously described with reference to FIG. 1, an augmented reality device may be used to provide a user with an augmented reality view of a physical space.

In this example, real-world objects 210 and 220 are real-world audio sources of real-world sounds that have real-world positions within the physical space. Real-world positioning of real-world audio sources may be identified by capturing real-worlds sounds produced by the real-world audio sources via a plurality of microphones that observe the physical space from different locations. Real-world positioning of a real-world audio source may be referred to as observed real-world positioning. An observed real-world positioning of a real-world audio source includes an observed position of the audio source, and may optionally include an observed orientation of that real-world audio source.

Also, in this example, virtual object 230 is a virtual audio source of virtual sounds that has a real-world position within the physical space. Real-world positioning of virtual audio sources may be defined by a 3D virtual model in which real-world positioning of one or more virtual audio sources are mapped to a physical space. Real-world positioning of a virtual audio source may be referred to as virtualized real-world positioning. A virtual real-world positioning of a virtual audio source includes a virtual position of the virtual audio source, and may optionally include a virtual orientation of that virtual audio source.

In this example, virtual object 230 is the previously described virtual monitor 130 of FIG. 1 that presents a video stream received from a communication partner. While a virtual monitor is again depicted in FIG. 2, a virtual object may take any form, and a virtual audio source may produce any virtual sound, including sounds simulating real-world sounds produced at the apparent real-world position of the virtual object.

In FIG. 2, real-world objects 210 and 220 take the form of real-world monitors outputting real-world sounds within physical space 200. While real-world monitors are again depicted in FIG. 2, a real-world object may be any physical object, and a real-world audio source may be any physical source of a real-world sound. A human subject is another example of a physical object that may be present within a physical space. A human subject speaking or moving within the physical space is an example of a real-world audio source of real-world sounds.

Within the augmented reality view of FIG. 2, graphical indicators are displayed as virtual objects that identify virtualized real-world positions of virtual audio sources and/or real-world positions of real-world audio sources within the physical space. In this example, graphical indicator 232 is displayed via the augmented reality device that identifies virtual object 230 as a virtual audio source of virtual sounds. Also, in this example, graphical indicator 212 identifies real-world object 210 as a real-world audio source, and graphical indicator 222 identifies real-world object 220 as another real-world audio source. In at least some implementations, graphical indicators that identify virtual audio sources may have a different visual appearance as compared to graphical indicators that identify real-world audio sources, and may convey status information concerning the audio source, such as volume level, mute on/off, whether the sound produced by the audio source is shared with a communications partner, etc. Graphical indicators may be selectable by a user to change an audio treatment policy applied to or state of the audio source.

FIG. 3 schematically depicts an example three-dimensional physical space 300 containing a plurality of microphones M1, M2, M3 of a spatially-diverse microphone array. Microphones M1, M2, M3 each have a real-world position within physical space 300 that differs from the other microphones of the spatially-diverse microphone array. Plural microphones of a spatially-diverse microphone array may be located on-board an individual device or may be distributed among a plurality of devices. In an example, microphones M1 and M2 may be located on-board a communication device, such as a wearable, head-mounted augmented reality device, and microphone M3 may be located on-board another communication device or may form part of a stand-alone audio recording device that observes physical space 300.

Physical space 300 further contains a plurality of real-world audio sources R1, R2, R3, each having a respective real-world position within physical space 300. As an example, R1 may correspond to a user of the communication device speaking or making another human generated sound, and R2 and R3 may correspond to other real-world audio sources within physical space 300.

Physical space 300 further contains a plurality of virtual audio sources V1, V2, V3, each having a respective virtualized real-world position within physical space 300. As an example, V1 may correspond to a virtual monitor that presents virtual sounds accompanying a video. V2 and V3 may correspond to other virtual audio sources, whether or not corresponding virtual objects representing the virtual audio sources are presented within the augmented reality view of the physical space.

Real-world and virtual sounds produced by real-world and virtual audio sources may be individually characterized as focus sounds or as background sounds. Focus sounds may be amplified (e.g., increased in relative volume) within an audio stream relative to background sounds and/or background sounds may be dampened (decreased in relative volume) relative to focus sounds within the audio stream. Focus sounds may be assigned to an audio-focus layer and background sounds may be assigned to a background-audio layer. Audio-focus and background-audio layers may individually or collectively define an audio treatment policy that is implemented by a sender of the audio stream. Alternatively or additionally, the audio treatment policy or a portion of that policy may be implemented by a receiver of the audio stream and/or by an intermediate communication device between the sender and the receiver.

In at least some implementations, a sound produced by an audio source may be characterized as a focus sound or a background sound based on positioning of the audio source within a physical space. Alternatively or additionally, a user selection may define whether a sound produced by an audio source is characterized as a focus sound or a background sound.

With regards to characterizing sounds based on positioning of audio sources within a physical space, FIG. 3 further depicts a first audio-focus region 310 and a second audio-focus region 312 within physical space 300. First audio-focus region 310 is represented by a three-dimensional conical or tapered shape, and second audio-focus region 312 is represented by a three-dimensional cube, as non-limiting examples.

An audio-focus region may have a variety of three-dimensional shapes depending on implementation. A shape of an audio-focus region may be based on a geometry of the physical space or physical objects located within the physical space, or may be user-defined. An audio-focus region may be used to identify focus sounds that are produced by audio sources located within the audio-focus region. Focus sounds may be emphasized within an audio stream relative to background sounds. An audio-focus region may be referred to as an audio-inclusion region. Background sounds produced by audio sources located outside of the audio-inclusion region may be completely filtered or reduced in volume with the goal of completely filtering the background sounds from the audio stream.

In an example, first audio-focus region 310 may correspond to a camera view of a video stream captured by a camera observing physical space 300, and may be referred to as a viewing region. A geometry of the viewing region may be based on a field of view or gaze axis (e.g., surround the gaze axis and/or the gaze axis defines a centerline of the viewing region) of the near-eye display device. The camera may be located on-board a communication device, such as in the case of a forward-facing head-mounted camera, for example, or the camera may form part of a standalone video recording device. A video stream captured by this camera optionally may be transmitted to a remote communication device accompanied by an audio stream captured by one or more microphones of the spatially diverse microphone array for presentation to a communication partner.

Second audio-focus region 312 is depicted in FIG. 3 as being physically separated from and non-overlapping with first audio-focus region 310 within physical space 300. However, in other examples, second audio-focus region 312 may partially overlap with first audio-focus region 310 or may reside entirely within first audio-focus region 310. Second audio-focus region 312 may reside within or outside of a camera view of the video stream. Second audio-focus region 312 may be referred to as an auxiliary audio-focus region in contrast to a viewing region.

In this example, sounds produced by audio sources located inside an audio-focus region may be characterized as focus sounds that are amplified or left undampened relative to background sounds within an audio stream. By contrast, sounds produced by audio sources located outside of an audio-focus region may be characterized as background sounds that are dampened relative to focus sounds within the audio stream.

A background-audio region may alternatively or additionally be used to identify background sounds that are produced by audio sources located within the background-audio region. A background-audio region may have a variety of three-dimensional shapes depending on implementation. A shape of a background-audio region may be based on a geometry of the physical space or physical objects located within the physical space, or may be user-defined. Background sounds may be de-emphasized within an audio stream relative to focus sounds. A background-audio region may be referred to as an audio-exclusion region. Background sounds produced by audio sources located inside of the audio-exclusion region may be completely or substantially filtered, or otherwise reduced in volume with the goal of completely or substantially filtering the background sounds from the audio stream.

As depicted in FIG. 3, real-world audio sources R1 and R2 each have a real-world position that is within first audio-focus region 310, whereas real-world audio source R3 has a real-world position that is outside of both first audio-focus region 310 and second audio-focus region 312. Here, real-world audio sources R1 and R2 are assigned to an audio-focus layer 322, and real-world audio source R3 is assigned to a background-audio layer 324.

As further depicted in FIG. 3, virtual audio source V1 has a virtualized real-world position within first audio-focus region 310, virtual audio source V2 has a virtualized real-world position within second audio-focus region 312, and virtual audio source V3 has a virtualized real-world position that is outside of both first audio-focus region 310 and second audio-focus region 312. Here, virtual audio sources V1 and V2 are assigned to audio-focus layer 322, and virtual audio source V3 is assigned to background-audio layer 324. In this example, sounds produced by real-world audio sources R1, R2, and virtual audio sources V1, V2 may be amplified relative to sounds produced by real-world audio source R3 and virtual audio source V3. Alternatively or additionally, sounds produced by real-world audio source R3 and virtual audio source V3 may be dampened relative to sounds produced by real-world audio sources R1, R2, and virtual audio sources V1, V2.

Real-world and virtual sounds produced by real-world and virtual audio sources may be individually characterized as private sounds or as shared sounds. Private sounds may be limited to presentation at an individual communication device of an individual subject user, whereas shared sounds may be transmitted to and presented by one or more additional communication devices of one or more additional communication partners. Private sounds may be assigned to a private layer and shared sounds may be assigned to a shared layer. The private and shared layers may individually or collectively define an audio treatment policy that is implemented by a sender of the audio stream. Alternatively or additionally, the audio treatment policy or a portion of that policy may be implemented by a receiver of the audio stream and/or by an intermediate communication device between the sender and the receiver.

In at least some implementations, a sound produced by an audio source may be characterized as a private sound or a shared sound based on positioning of the audio source within a physical space. In an example, far-field sounds located far from a subject user may be characterized as private sounds, whereas near-field sounds located nearer to the subject user may be characterized as shared sounds. In another example, private and shared regions may be defined within a 3D physical space within which audio sources may be characterized as private or shared. Alternatively or additionally, a user selection may define whether a sound produced by an audio source is characterized as a private sound or a shared sound. In yet another example, virtual sounds may be characterized as private sounds and real-world sounds may be characterized as shared sounds, or vice-versa.

FIG. 3 depicts a private layer 320 with which previously described audio-focus layer 322 and background-audio layer 324 may be associated. Private layer 322 may define how sounds are heard by and/or presented to only the subject user of the private layer. FIG. 3 further depicts a shared layer 330 that may define how sounds are heard by and/or presented to one or more additional communication partners. Within this context, a communication device of the subject user is typically the sender of the audio stream, and a communication device of a communication partner is typically the receiver of the audio stream. Differences in private and shared layers may be used to provide different audio streams to be presented at a sender and a receiver of the audio stream. However, different privacy settings may be applied to different communication partners so that the sounds that each communication partner hears can be individually controlled.

In the illustrated example, shared layer 330 is associated with audio-focus layer 332 that differs from audio-focus layer 322, and is further associated with background-audio layer 334 that differs from background-audio layer 324. For example, audio-focus layer 332 does not include R2 or V2. Hence, sounds produced by R2 or V2 may be dampened within or entirely filtered from the audio stream transmitted to a communication partner. Here, region 312 may be defined as a private region within which sounds produced by audio sources (e.g., V2) are characterized as private sounds. This example provides a scenario in which a communication partner receives a different representation of sounds as compared to a subject user and/or another communication partner.

FIG. 3 depicts an example in which different two audio-focus layers and two background-audio layers are provided. In at least some implementations, a plurality of audio-focus layers and/or background-audio layers may be provided, in which each layer defines a different level of filtering to be applied to sounds produced by audio sources assigned to that layer. Each layer of a plurality of layers may be further associated with a respective set of one or more user-defined 3D regions and/or user selections, such that audio sources present within or outside of a particular user-defined region or audio sources selected by a user are filtered to achieve a particular volume reduction or volume increase.

As non-limiting examples, a user may define a first exclusion region for which sounds produced by audio sources located within the first exclusion region are completely eliminated from the audio stream. A user may define a second exclusion region for which sounds produced by audio sources located within the second exclusion region are reduced in volume, but not eliminated from the audio stream. A user may select a first virtual audio source and a first real-world audio source as being a normal or default volume within the audio stream, and may further select a second virtual audio source and a second real-world audio source for volume increase or volume reduction within the audio stream. In at least some implementations, feedback from a communication partner may be automatically filtered from the audio stream regardless of the real-world positioning of audio sources or user selections. This automatic filtering of feedback may take the form of a separate feedback layer (e.g., an overriding feedback layer) that eliminates or substantially reduces feedback from communication partners.

Figure 4:
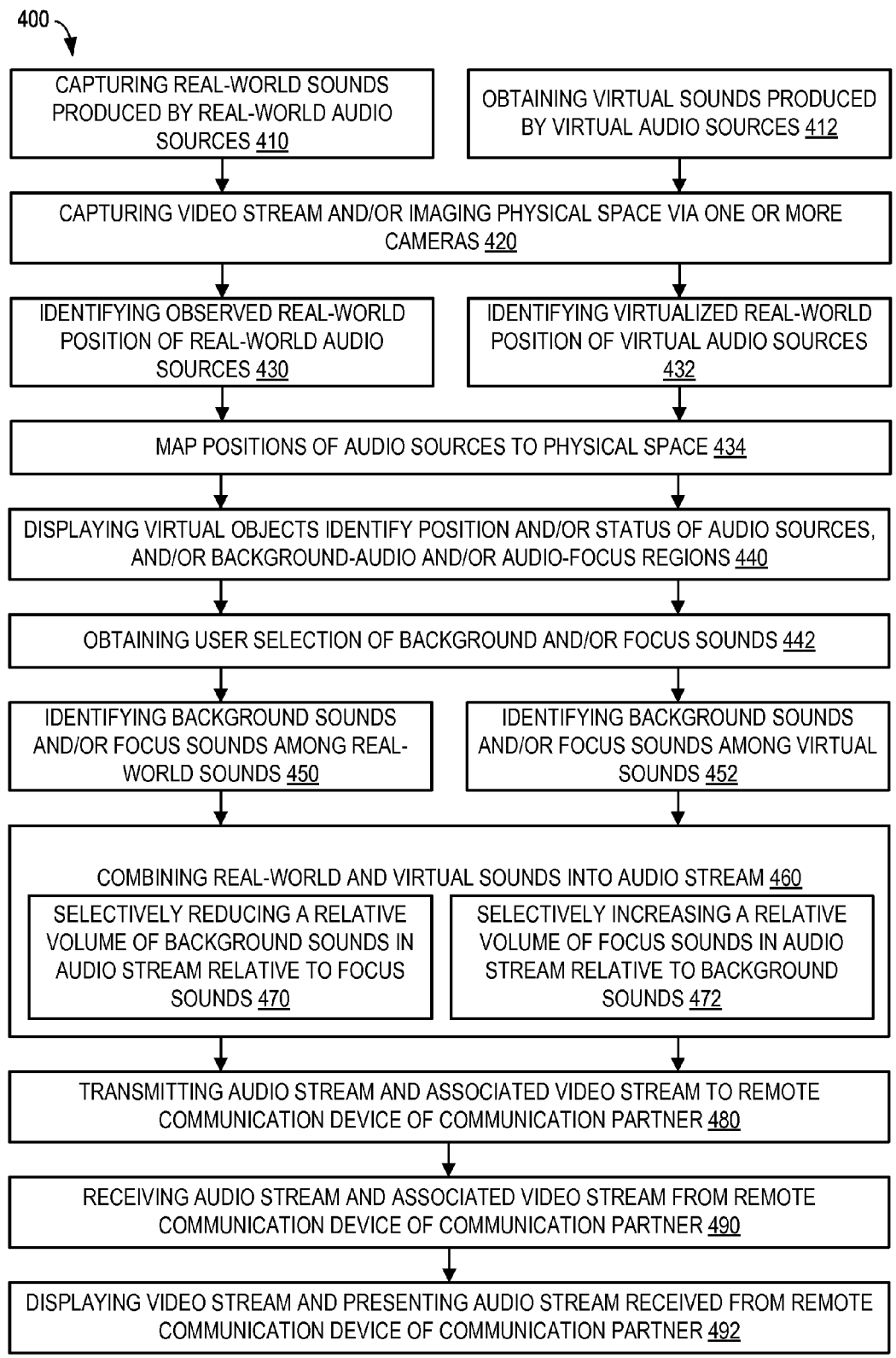
FIG. 4 is a flow diagram depicting an example conferencing method.

FIG. 4 is a flow diagram depicting an example communication method 400. In an example, method 400 may be performed by a conferencing system that supports audio and/or video conferencing between two or more communication partners via their respective communication devices.

At 410, the method includes capturing real-world sounds produced by one or more real-world audio sources. In an example, a spatially-diverse microphone array including a plurality of microphones captures the real-world sounds from a plurality of different locations. The plurality of microphones may be located on-board an individual device, or may be distributed among two, three or more devices located within or observing a physical space.

In an example, a communication device of a user such as a near-eye display device, for example, may include two or more microphones that capture real-world sounds from first and second locations spaced apart from each other on-board the communication device. Additionally or alternatively, one or more microphones may be located off-board the communication device and may be located on-board one or more other devices that capture real-world sounds from one or more additional or alternative locations. In an example, two or more communication devices may be operated by respective users within audio capture range of each other, with each communication device having one or more microphones capturing real-world sounds observed within the same physical space. Additionally or alternatively, a stand-alone audio capture device may observe the physical space by capturing real-world sounds via one, two, or more microphones.

At 412, the method includes obtaining virtual sounds produced by one or more virtual audio sources. A virtual sound may include any pre-recorded real-world sound or any computer generated sound, which may include artificial sounds and/or augmented and/or time-delayed forms of pre-recorded real-world sounds. Virtual sounds may be obtained by generating or referencing a virtual model that defines a 3D virtual space containing one or more virtual audio sources located at respective positions within the 3D virtual space. Each virtual audio source may be associated with a respective virtual sound having associated virtual acoustic properties.

In an example, a virtual audio source may take the form of a virtual point source having a three-degrees-of-freedom (3DOF) position in virtual space that emits an omnidirectional virtual sound at a virtual volume level. In another example, a virtual audio source may provide a directional sound propagation pattern having a six-degrees-of-freedom (6DOF) position/orientation in virtual space that emits a virtual sound at a virtual volume level.

At 420, the method includes capturing a video stream and/or imaging a physical space via one or more cameras. The one or more cameras may be located on-board an individual device, or may be distributed among two or more devices. In an example, a camera located on-board a communication device may be operated by a user to capture a video stream of the user (i.e., self-capture) and/or other physical objects located within the surrounding physical space. Some communication devices, such as a wearable and/or head-mounted device may include an on-board camera that captures a video stream that approximates a first-person view of the user. In another example, a device that is remote from the user's communication device may include a camera that captures a video stream of the user and/or surrounding physical space. Two or more communication devices having on-board cameras may be operated by respective users within the same physical space to observe each other and/or the physical surroundings. Standalone video capture devices located within the physical space may include cameras to capture a video stream of the user and/or physical surroundings from one or more vantage points.

One or more cameras may include depth cameras that image the physical space to obtain measurements of depth across an array of pixels. A model of the physical space, including physical objects located therein, may be generated from depth measurements obtained from one or more depth cameras. In an example, depth measurements may be obtained from two or more vantage points by way of a single camera that changes position or orientation within the physical space and/or from two or more cameras having different vantage points.

At 430, the method includes identifying a real-world positioning of each of the one or more real-world audio sources. In an example, receive-beamforming based on differences in phase/time of arrival between correlated real-world sounds captured via the plurality of microphones of the spatially-diverse microphone array may be used to identify the real-world position of each real-world audio source. Real-world positioning may refer to a 3DOF position in 3D space, a 6DOF position/orientation within 3D space, or other degree-of-freedom definition.

Depth camera imaging performed at 420 may be used to improve accuracy of the real-world position identified at 430. For example, a range of possible real-world positions of the real-world audio sources may be reduced based on a model obtained from depth camera imaging. The real-world positions identified at 430 may be resolved or otherwise improved over time based on real-world sounds captured at 410 and/or depth camera imaging performed at 420. Changing vantage points of depth cameras and/or microphones within a physical space may further enable the real-world positions of audio sources to be more accurately identified.

At 432, the method includes identifying a virtualized real-world positioning of each of the one or more virtual audio sources. In an example, a virtual model describing the position/orientation and acoustic properties of the virtual audio sources may be mapped to or aligned with a model of the physical space to identify the virtualized real-world position/orientation of each of the virtual audio sources. Virtualized real-world positioning may refer to a 3DOF position, a 6DOF position/orientation, or other degree-of-freedom definition.

At 434, the method includes mapping the positioning of real-world and virtual audio sources to the physical space. Each real-world or virtual audio source may be mapped to a 3DOF position, a 6DOF position/orientation, or other degree-of-freedom definition within a model of the physical space. Microphones observing the physical space may also be mapped to a 3DOF position or 6DOF position/orientation within the model of the physical space. When microphones and/or cameras are distributed across two or more devices that move relative to one another, a shared coordinate system may be used to resolve real-world positioning.

At 440, the method includes displaying virtual objects identifying position and/or status of real-world and/or virtual audio sources within an augmented reality view of the physical space. Virtual objects may be displayed via a near-eye display device, a see-through near-eye display device, or other display device that provides a camera view of the physical space overlaid with virtual objects. Alternatively or additionally, the method at 440 includes displaying virtual objects identifying background-audio and/or audio-focus regions of the physical space. A virtual object may take the form of a graphical indicator overlaying a real-world view of the physical space.

The virtual objects may be used to provide the user with visual feedback of; (1) the position of the audio sources within an augmented reality view of the physical space; (2) the status of the audio sources, such as (2.1) whether the audio source is a real-world audio source or a virtual audio source, (2.2) an observed volume of the audio source from the vantage point of the user, (2.3) an absolute volume of the audio source, (2.4) whether the sound produced by the audio source has been shared with a communication partner within an audio stream transmitted to a remote communication device, (2.5) whether the sound produced by the audio source is being dampened or amplified within an audio stream transmitted to a remote communication device, (2.6) whether the sound produced by the audio source is being dampened or amplified within an audio stream presented to the user, (2.7) whether the audio source has been selected for volume reduction or volume increase; and (3) a boundary of background-audio regions or audio-focus regions which define an audio treatment policy that is applied to the sounds produced by the audio source.

A virtual object may be displayed to provide an appearance of the virtual object being physically present within the physical space from the perspective of the user. A virtual surface may have an apparent real-world position in 3D space at or near the position of the audio source. A virtual object may take the form of a virtual surface that is overlaid with a texture. Virtual surfaces may be displayed as opaque or transparent surfaces. Textures may include or may be derived from images, and may include color or light treatments.

In an example, a virtual object may include a color or light treatment that provides the appearance of highlighting of the audio source and/or a real-world or virtual object that represents the audio source. In another example, a virtual object may take the form of a graphical icon or text that is presented at or near the audio source and/or object that represents the audio source. An appearance of the graphical icon or highlighting, or human readable information of the text may visually convey status information regarding the audio source. Boundaries defining background-audio regions or audio-focus regions may be represented within an augmented reality view by lines or highlighting having apparent 3D positions within the physical space. These various forms of visual feedback may enable a user to view current selections on an audio source-by-source basis and/or region-by-region basis.

At 442, the method includes obtaining user selection of background and/or focus sounds. In an example, a user may assign one or more audio sources to a background-audio layer or to an audio-focus layer to define an audio treatment policy to be applied to the sounds produced by those sources. As previously described with reference to FIG. 3, a user may define regions and/or utilize user selections to assign individual audio sources or groups of audio sources to audio-focus layers and/or background audio layers. A plurality of audio-focus layers and/or a plurality of background-audio layers may be used to achieve any desired number of different audio treatments, including the elimination of sounds, reduction in volume to one or more different levels, increase in volume to one or more different levels, and/or the inclusion of sounds within the audio signal. A subject user and each remote communication partner of the subject user may define different audio treatment policies (e.g., by regions or user selections) to be applied to the audio stream presented at their particular communication device or to be applied to audio streams transmitted to a remote communication device of another communication partner.

A user selection may be received as a user input via a user input device. A user input device may take a variety of different forms, including an optical body-tracking user input device that enables a user to provide user input by moving a body part, a microphone that enables a user to speak a command, a hand-held remote control, a game controller, a pointing device such as a computer mouse, a keyboard, etc. The user input device may form part of a communication device of a subject user, and a user selection may be received from the communication device of the subject user. The user input device may form part of a remote communication device of a communication partner, and the user selection may be received from the remote communication device of the communication partner over a communication network. Amplification, dampening, and/or filtering of sounds produced by one or more audio sources may be performed responsive to user selection of the one or more audio sources from among a plurality of real-world and/or virtual audio sources.

In an example, a user may direct a user selection at a particular audio source by directing a user input at or toward a virtual object that represents the audio source or identifies a position and/or status of the audio source within an augmented reality view of the physical space. In another example, a user may move a boundary of an audio-focus region or background-audio region within 3D space and/or may add or remove audio-focus regions or background-audio regions to change how an audio treatment policy is applied to the audio sources. A status of an audio source may be visually updated at 440 responsive to user selections obtained at 442.

In at least some implementations, a plurality of pre-defined modes may be selectable by a user to change the audio treatment policy applied to the audio stream. In an example, responsive to user selection of a first filter mode, the virtual sounds may be identified as being included within the background sounds for which the relative volume is reduced, and responsive to user selection of a second filter mode, the virtual sounds may be identified as being excluded from the background sounds for which the relative volume is reduced. In this example, a volume of real-world sounds may be reduced or increased relative to virtual sounds. For example, virtual sounds may be filtered from the audio stream or real-world sounds may be filtered from the audio stream.

At 450, the method includes identifying background sounds and/or focus sounds among the real-world sounds produced by the one or more real-world audio sources. At 452, the method includes identifying background sounds and/or focus sounds within or among the virtual sounds produced by the one or more virtual audio sources. The background and/or focus sounds identified at 450 and 452 may be based on user selections obtained at 442 and/or the positioning of the underlying audio sources relative to background-audio regions and/or audio-focus regions. For example, each virtual audio source may be associated with a virtualized real-world position that is compared to a model describing the physical space in 3D space to determine whether that virtual audio source resides within an audio-focus region or a background-audio region. Similarly, each real-world position of each real-world audio source may be compared to the model describing the physical space to determine whether the real-world audio source resides within an audio-focus region or a background-audio region.

At 460, the method includes combining real-world sounds and virtual sounds into an audio stream. As a sub-process of 460, at 470, the method includes selectively reducing a relative volume of background sounds in the audio stream relative to focus sounds. In an example, an audio filter is configured to selectively reduce the relative volume of the background sounds. In at least some implementations, the relative volume of the background sounds may be reduced to zero or toward a target of zero to completely filter or substantially filter, or with the goal of completely or substantially filtering the background sounds from the audio stream.

A relative volume of background sounds may be selectively reduced in the audio stream based, at least in part, on real-world positioning of corresponding audio sources. In an example, reducing the relative volume of real-world sounds identified as background sounds may be based, at least in part, on observed real-world positioning of one or more real-world audio sources of the real-world sounds captured via the spatially-diverse microphone array. For example, real-world sounds having real-world positions within a background-audio region may be identified as background sounds and reduced in relative volume within the audio stream. If positioned outside of the background-audio region, these sounds may be excluded from the background sounds that are reduced in relative volume within the audio stream.

Reducing the relative volume of virtual sounds identified as background sounds may be based, at least in part, on virtualized real-world positioning of one or more virtual audio sources of the virtual sounds. For example, virtual sounds having virtualized real-world positions within a background-audio region may be identified as background sounds and reduced in relative volume within the audio stream. If positioned outside of the background-audio region, these sounds may be excluded from the background sound that are reduced in relative volume within the audio stream.

In at least some implementations, an audio source is individually selectable for volume reduction relative to other audio sources. For example, as previously described with reference to 442, a user selection may be obtained from one or more sources that identifies background sounds for volume reduction relative focus sounds. User selections may be used alone or in combination with positioning to identify background sounds.

In at least some implementations, an audio source associated with a remote communication partner may be automatically filtered regardless of the virtualized positioning of the corresponding virtual sound source and/or the individual selections of a user. Such filtering may decrease or eliminate undesirable feedback for the communication partner.

Alternatively or additionally, at 472, as a sub-process of 460, the method includes selectively increasing a relative volume of focus sounds within the audio stream relative to background sounds. In an example, an audio filter in the form of an audio amplifier is configured to selectively increase the relative volume of the focus sounds. Increasing the relative volume of real-world sounds identified as focus sounds may be based, at least in part, on observed real-world positioning of one or more real-world audio sources of the real-world sounds captured via the spatially-diverse microphone array. Increasing the relative volume of virtual sounds identified as focus sounds may be based, at least in part, on virtualized real-world positioning of one or more virtual audio sources of the virtual sounds. In an example, focus sounds may be identified and increased in relative volume if the audio sources are located within an audio-focus region or if the audio sources are located outside of a background-audio region.

In at least some implementations, an audio source is individually selectable for volume increase relative to other audio sources. For example, as previously described with reference to 442, a user selection may be obtained from one or more sources that identifies focus sounds for volume increase relative background sounds. User selections may be used alone or in combination with positioning to identify focus sounds.

At 480, the method includes transmitting the audio stream (and associated video stream captured at 420, if any) to the remote communication device of the communication partner. The audio stream may include real-world sounds produced by one or more real-world audio sources captured by the spatially-diverse microphone array. Additionally or alternatively, the audio stream may include virtual sounds produced by one or more virtual audio sources having virtualized real-world positioning. In an example, an audio communication interface of a communication device or an intermediate device is configured to transmit the audio stream to the remote communication device.

In conferencing scenarios involving a plurality of remote communication devices of a plurality of communication partners, the audio stream and video stream may be transmitted to each remote communication device. In at least some implementations, an intermediate server system may facilitate the transmission of the audio stream and video stream to each of the remote communication devices. The audio stream and the video stream may be transmitted over one or more communication networks, including one or more of a personal area network, a local area network, and/or a wide area network, depending on implementation. In some scenarios, the remote communication device may reside nearby, within the same general physical space as the communication device transmitting the audio and video streams.

At 490, the method includes receiving an audio stream (and associated video stream, if any) from the remote communication device of the communication partner. In conferencing scenarios involving a plurality of remote communication devices of a plurality of communication partners, the audio streams and video streams may be received from each remote communication device. In at least some implementations, an intermediate server system may facilitate the transmission of a plurality of audio streams and video streams to the communication device as a combined or composite audio/video stream.

At 492, the method includes displaying the video stream and presenting the audio stream received from the remote communication device of the communication partner. In an example, the video stream may be overlaid on a surface of a virtual object as a texture to provide the appearance of a virtual monitor. For example, a near-eye augmented reality device may be configured to display virtual objects having an apparent real-world position within the physical space. The audio stream may be presented to the user via one or more audio speakers or other sound transducers.

FIG. 5 depicts an example near-eye display device 500. In this example, near-eye display device 500 takes the form of a wearable, head-mounted augmented reality device or virtual reality device that is worn by a user. Near-eye display device 500 is a non-limiting example of communication device 120 of FIG. 1. It will be understood that near-eye display device 500 may take a variety of different forms from the configuration depicted in FIG. 5. Near-eye display device 500 alone or in combination with one or more remote devices may form a conferencing system that performs or otherwise implements the various processes and techniques described herein. In at least some implementations, Near-eye display device 500 includes one or more display panels that display computer generated graphics. In at least some implementations, near-eye display device 500 is configured to display video received from a remote communication device of a communication partner. Near-eye display device 500 may include a right near-eye display panel 510 for right-eye viewing and a left near-eye display panel 512 for left-eye viewing. Right near-eye display panel 510 is configured to display right-eye virtual objects at right-eye display coordinates. Left near-eye display panel 512 is configured to display left-eye virtual objects at left-eye display coordinates. In another example, a unitary display panel may extend over both right and left eyes of the user, providing a common near-eye display that is shared by both right and left eyes of the user.

Right and left near-eye display panels 510, 512 may be at least partially transparent or fully transparent, enabling a user to view a physical space of a real-world environment through the display panels. In this context, a display panel may be referred to as a see-through display panel. Light received from the real-world environment passes through the see-through display panel to the eye or eyes of the user. Graphical content displayed by right and left near-eye display panels 510, 512, if configured as see-through display panels, may be used to visually augment an appearance of the physical space viewed by the user through the see-through display panels. In this configuration, the user is able to view virtual objects that do not exist within the physical space at the same time that the user views physical objects within the physical space. This creates an illusion or appearance that the virtual objects are physical objects or physically present light-based effects located within the physical space.

Near-eye display device 500 may include a variety of on-board sensors forming a sensor subsystem 520. A sensor subsystem may include one or more forward-facing cameras 522 (e.g., facing away from the user and/or in a viewing direction of the user), one or more rearward-facing cameras 524 (e.g., facing toward the user and/or toward one or both eyes of the user), and a variety of other sensors described herein. One or more forward-facing cameras (e.g., depth cameras) may be configured to observe the physical space and output observation information (e.g., depth information across an array of pixels) for the physical space observed by the one or more forward-facing cameras.

Forward-facing cameras and rearward-facing cameras, such as 522, 524 may include infrared, near-infrared, and/or visible light cameras. Forward-facing camera(s) may include one or more depth cameras, and/or the rearward-facing cameras may include one or more eye-tracking cameras. In some implementations, sensor subsystem 520 may communicate with one or more off-board sensors that send observation information to the near-eye display device. For example, a depth camera used by a gaming console may send depth maps and/or modeled virtual body models to the near-eye display device.

Sensor subsystem 520 of near-eye display device 500 may further include one or more accelerometers/inertial sensors 560 to identify orientation, motion, and/or acceleration of near-eye display device or changes therein, for example. Sensor subsystem 520 of near-eye display device 500 may further include one or more microphones. One or more microphones of near-eye display device 500 may form part of a spatially-diverse microphone array as discussed herein. In an example, near-eye display device 500 includes two microphones 582*a* and 582*b* to provide spatial-diversity on-board the display device.

Near-eye display device 500 may include one or more audio speakers. Two audio speakers 580*a* and 580*b* of near-eye display device 500 may be included to provide stereo sound. Stereo sound effects may provide the user with the perception of virtual sounds being positioned at virtualized real-world positions within a physical space. In other implementations, the near-eye display device may be communicatively coupled to an off-board speaker. In either case, one or more speakers may be used to play an audio stream that accompanies graphical content displayed by the near-eye display device.

A volume of an audio stream may be modulated in accordance with a variety of different parameters. As one example, the volume of the audio stream may be modulated according to an inverse relationship to a distance between the near-eye display device and a virtualized real-world position of a virtual audio source. Sound may be localized to an audio source so that as a user gets closer to the audio source, the volume of the audio source will increase. As another example, volume of the audio stream may be modulated in proportion to a directness of the audio source (e.g., an orientation of a directional audio source).

When two or more audio sources are present, the respective sounds produced by the audio sources may be mixed together or played independently. When mixed together, the relative contribution of any particular audio source may be weighted based on a variety of different parameters, such as proximity or directness of view. For example, the closer a user is to a particular audio source and/or the more directly the user looks at the audio source, the louder the volume associated with that audio source will be played.

When played independently, sounds produced by a particular audio source may be played instead of sounds produced by other audio sources based on a variety of different parameters, such as proximity and/or directness of view. For example, as a user looks around a physical space in which several audio sources are present, only the sounds produced by the audio source that is most directly in the user's field of vision may be played. Eye-tracking may be used to more accurately assess where a user's focus or gaze axis is directed, and such focus may serve as a parameter for modulating volume.

Near-eye display device 500 may include one or more features that allow the display device to be worn on a user's head. In the illustrated example, head-mounted display 500 takes the form of eye glasses and includes a nose rest 592 and ear rests 590a and 590b. In other implementations, the display device may include a hat, visor, or helmet with an in-front-of-the-face see-through visor. Furthermore, while described in the context of a head-mounted see-through near-eye display device, the concepts described herein may be applied to see-through displays that are not head mounted (e.g., a windshield) and to displays that are not see-through (e.g., an opaque display that renders real objects observed by a camera with virtual objects not within the camera's field of view).

Near-eye display device 500 may include an on-board logic subsystem 530 that includes one or more processor devices and/or logic machines that perform the processes or operations described herein, as defined by instructions executed by the logic subsystem. Such processes or operations may include generating and providing image signals to the display panels, processing audio information, receiving sensory signals from sensors, and enacting control strategies and procedures responsive to those sensory signals. Near-eye display device 500 may include an on-board data storage subsystem 540 that includes one or more memory devices holding instructions (e.g., software and/or firmware) executable by logic subsystem 530, and may additionally hold other suitable types of data.

Logic subsystem 530 and data-storage subsystem 540 may be referred to collectively as an on-board controller or on-board computing device of near-eye display device 500. In an example, this on-board controller or computing device may include or otherwise implement an audio filter and/or a spatial audio amplifier as described herein. Furthermore, this on-board controller or computing device may include a receive-beamforming engine that is configured to receive and process audio signals received from a plurality of microphones of a spatially-diverse microphone array, and identify a real-world position of each audio source observed by the microphones.

Near-eye display device 500 may include a communications subsystem 550 supporting wired and/or wireless communications with remote devices (i.e., off-board devices) over a communication network. As an example, the communication subsystem may be configured to wirelessly receive and/or transmit a video stream, audio stream, coordinate information, virtual object descriptions, and/or other information from remote devices to render virtual objects and textures simulating a virtual monitor. In at least some implementations, communications subsystem 550 may include an audio communication interface configured to transmit an audio stream to and/or receive an audio stream from one or more remote communication devices of one or more communication partners.

Logic subsystem 530 may communicate with a remote computing system via communications subsystem 550 to send and/or receive signal information over a communication network. In some examples, at least some information processing and/or control tasks relating to near-eye display device 500 may be performed by or with the assistance of one or more remote computing devices. As such, information processing and/or control tasks for near-eye display device 500 may be distributed across on-board and remote computing devices.

The above described techniques, processes, operations, and methods may be tied to a computing system that is integrated into a head-mounted display and/or a computing system that is configured to communicate with a head-mounted display. In particular, the methods and processes described herein may be implemented as a computer application, computer service, computer API, computer library, and/or other computer program product, which may be implemented by a head-mounted display and/or other computing system.

FIG. 6 schematically shows a non-limiting example of a computing system 600 that may perform one or more of the above described methods and processes. Computing system 600 may include or form part of a conferencing system, as previously described. Computing system 600 is shown in simplified form. It is to be understood that virtually any computer architecture may be used without departing from the scope of this disclosure. In different implementations, computing system 600 may take the form of a head-mounted display computer, mainframe computer, server computer, desktop computer, laptop computer, tablet computer, home entertainment computer, network computing device, mobile computing device, mobile communication device, gaming device, etc.

Computing system 600 includes a logic subsystem 602 and a data storage subsystem 604. Computing system 600 may optionally include a display subsystem 606, audio subsystem 608, sensor subsystem 610, communication subsystem 612, and/or other components not shown in FIG. 6.

Logic subsystem 602 may include one or more physical devices configured to execute one or more instructions. For example, the logic subsystem may be configured to execute one or more instructions that are part of one or more applications, services, programs, routines, libraries, objects, components, data structures, or other logical constructs.

Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data storage subsystem 604 may include one or more physical, non-transitory, devices configured to hold data and/or instructions executable by the logic subsystem to implement the herein described methods and processes. When such methods and processes are implemented, the state of data storage subsystem 604 may be transformed (e.g., to hold different data).

Data storage subsystem 604 may include removable media and/or built-in devices. Data storage subsystem 604 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data storage subsystem 604 may include devices with one or more of the following characteristics: volatile, nonvolatile, dynamic, static, read/write, read-only, random access, sequential access, location addressable, file addressable, and content addressable. In some implementations, logic subsystem 602 and data storage subsystem 604 may be integrated into one or more common devices, such as an application specific integrated circuit or a system on a chip.

FIG. 6 also shows an aspect of the data storage subsystem in the form of removable computer-readable storage media 614, which may be used to store and/or transfer data and/or instructions executable to implement the herein described methods and processes. Removable computer-readable storage media 614 may take the form of CDs, DVDs, HD-DVDs, Blu-Ray Discs, EEPROMs, and/or floppy disks, among others.

It is to be appreciated that data storage subsystem 604 includes one or more physical, non-transitory devices. In contrast, in some implementations aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

Software modules or programs may be implemented to perform one or more particular functions. In some cases, such a module, engine, or program may be instantiated via logic subsystem 602 executing instructions held by data storage subsystem 604. It is to be understood that different modules, engines, or programs may be instantiated from the same application, service, code block, object, library, routine, API, function, etc. Likewise, the same module, engine, or program may be instantiated by different applications, services, code blocks, objects, routines, APIs, functions, etc. The terms "module", "engine", and "program" are meant to encompass individual or groups of executable files, data files, libraries, drivers, scripts, database records, etc.

When included, display subsystem 606 may be used to present a visual representation of data held by data storage subsystem 604. As the herein described methods and processes change the data held by the data storage subsystem, and thus transform the state of the data storage subsystem, the state of display subsystem 606 may likewise be transformed to visually represent changes in the underlying data. Display subsystem 606 may include one or more display devices utilizing virtually any type of technology. Such display devices may be combined with logic subsystem 602 and/or data storage subsystem 604 in a shared enclosure (e.g., a head-mounted display with onboard computing), or such display devices may be peripheral display devices (a near-eye display with off-board computing).

As one non-limiting example, the display subsystem may include image-producing elements (e.g. see-through OLED displays) located within lenses of a head-mounted display. As another example, the display subsystem may include a light modulator on an edge of a lens, and the lens may serve as a light guide for delivering light from the light modulator to an eye of a user. In either case, because the lenses are at least partially transparent, light may pass through the lenses to the eyes of a user, thus allowing the user to see through the lenses.

The sensor subsystem may include and/or be configured to communicate with a variety of different sensors. For example, a near-eye display device may include at least one rearward-facing camera and/or at least one forward-facing camera. The rearward-facing camera may be an eye tracking image sensor configured to acquire image data to allow a viewer's eyes to be tracked. The forward-facing camera may detect gesture-based user inputs or provide depth imaging of a physical space. For example, a forward-facing camera may include a depth camera, a visible light camera, or another position tracking camera. Further, such forward-facing cameras may have a stereo configuration. For example, a near-eye display device may include two depth cameras to observe the physical space in stereo from two different angles of the user's perspective. In some implementations, gesture-based user inputs may be detected via one or more off-board cameras.

Further, a forward-facing camera may capture images of a physical space, which may be provided as input to an onboard or off-board 3D modeling system. A 3D modeling system may be used to generate a 3D model of the physical space. Such 3D modeling may be used to localize a precise position of a near-eye display device in a physical space so that virtual monitors may be rendered so as to appear in precise locations relative to the physical space. Furthermore, 3D modeling may be used to accurately identify real-world surfaces to which virtual objects can be constrained. To facilitate such 3D modeling, the sensor subsystem may optionally include an infrared projector to assist in structured light and/or time of flight depth analysis.

The sensor subsystem may also include one or more motion sensors to detect movements of a viewer's head when the viewer is wearing the head-mounted display. Motion sensors may output motion data for tracking viewer head motion and eye orientation, for example. As such, motion data may facilitate detection of tilts of the user's head along roll, pitch and/or yaw axes. Further, motion sensors may enable a position of the head-mounted display to be determined and/or refined. Likewise, motion sensors may also be employed as user input devices, such that a user may interact with the near-eye display device via gestures of the neck, head, or body. Non-limiting examples of motion sensors include an accelerometer, a gyroscope, a compass, and an orientation sensor. Further, a near-eye display may be configured with global positioning system (GPS) capabilities.

Audio subsystem 608 may include or be configured to utilize one or more speakers for playing audio streams and/or other sounds as discussed above. The sensor subsystem may also include one or more microphones to allow the use of voice commands as user inputs and to support receive-beamforming.

When included, communication subsystem 612 may be configured to communicatively couple computing system 600 with one or more other computing devices. Communication subsystem 612 may include wired and/or wireless communication devices compatible with one or more different communication protocols. As non-limiting examples, the communication subsystem may be configured for communication via a wireless telephone network, a wireless local area network, a wired local area network, a wireless wide area network, a wired wide area network, etc. In some implementations, the communication subsystem may allow computing system 600 to send and/or receive messages to and/or from other devices via a network such as the Internet.

In an example, a conferencing system comprises: a near-eye display device configured to display video received from a remote communication device of a communication partner; a spatially-diverse microphone array including a plurality of microphones; an audio communication interface configured to transmit, to the remote communication device of the communication partner, an audio stream including real-world sounds produced by one or more real-world audio sources captured by the spatially-diverse microphone array and virtual sounds produced by one or more virtual audio sources; and an audio filter configured to selectively reduce a relative volume of background sounds in the audio stream based, at least in part, on real-world positioning of corresponding audio sources. In this example or any other example, the audio filter is configured to selectively reduce the relative volume of background virtual sounds in the audio stream based, at least in part, on virtualized real-world positioning of the one or more virtual audio sources. In this example or any other example, the virtualized real-world positioning of the one or more virtual audio sources are mapped to a physical space. In this example or any other example, the audio filter is configured to selectively reduce the relative volume of background virtual sounds in the audio stream based, at least in part, on an observed real-world positioning of the one or more real-world audio sources. In this example or any other example, the observed real-world positioning of the one or more real-world audio sources is identified using receive-beamforming of the real-world sounds captured by each of the plurality of microphones having spatially diverse positioning within a physical space. In this example or any other example, responsive to user selection of a first filter mode, a sound is included within the background sounds; and wherein responsive to user selection of a second filter mode, the sound is excluded from the background sounds. In this example or any other example, an audio source is individually selectable for volume reduction relative to other audio sources. In this example or any other example, a sound is included within the background sounds if a real-world positioning of a corresponding audio source is not within a three-dimensional audio-inclusion region; and the sound is excluded from the background sounds if the real-world positioning of the corresponding audio source is within the three-dimensional audio-inclusion region. In this example or any other example, the three-dimensional audio-inclusion region is based on a field of view or gaze axis of the near-eye display device. In this example or any other example, the three-dimensional audio-inclusion region is user-defined. In this example or any other example, a sound is included within the background sounds if a real-world positioning of a corresponding audio source is within a three-dimensional audio-exclusion region; and the sound is excluded from the background sounds if the real-world positioning of the corresponding audio source is not within the three-dimensional audio-exclusion region. In this example or any other example, the three-dimensional audio-exclusion region is based on a field of view or gaze axis of the near-eye display device. In this example or any other example, the three-dimensional audio-exclusion region is user-defined. In this example or any other example, the near-eye display device is configured to display a graphical indicator overlaying a real-world view of a physical space and identifying an audio source selected for volume reduction. In this example or any other example, the near-eye display device is configured to display a graphical indicator overlaying a real-world view of a physical space and identifying a real-world positioning of an audio source.

In an example, a conferencing method comprises: capturing, via a plurality of microphones of a spatially-diverse microphone array, real-world sounds produced by one or more real-world sources having real-world positioning within a physical environment; combining the real-world sounds and virtual sounds into an audio stream, the virtual sounds produced by one or more virtual audio sources having virtualized real-world positioning within the physical environment; displaying a virtual object via an augmented reality display device, the virtual object representing the virtual audio source at a corresponding virtualized real-world positioning; selectively filtering the virtual sounds from the audio stream based on the virtualized real-world positioning of the one or more virtual audio sources; and transmitting the audio stream to a remote communication device of a communication partner. In this example or any other example, the method further comprises selectively filtering the real-world sounds from the audio stream based on observed real-world positioning of the one or more real-world audio sources. In this example or any other example, the method further comprises receiving a user selection from the remote communication device over a communication network; and filtering from the audio stream, an audio source selected from among the plurality of real-world audio sources and the virtual audio source responsive to the user selection.

In an example, a conferencing system, comprises: a spatially-diverse microphone array including a plurality of microphones; an audio communication interface configured to transmit, to a remote communication device of a communication partner, an audio stream including real-world sounds produced by one or more real-world audio sources captured by the spatially-diverse microphone array and virtual sounds produced by one or more virtual audio sources having virtualized real-world positioning; an audio filter configured to selectively amplify or dampen a relative volume of one or more of the real-world sounds and the virtual sounds within the audio stream; and an augmented reality display device configured to display, within an augmented reality view of a physical space, video received from a remote communication device of the communication partner, and to display graphical indicators identifying observed real-world positioning of the one or more real-world audio sources and the virtualized real-world positioning of the one or more virtual audio sources. In this example or any other example, the relative volume of one or more of the real-world sounds and the virtual sounds within the audio stream is selectively amplified or dampened responsive to user input directed at the one or more graphical indicators.

It is to be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A conferencing system, comprising:
   a near-eye display device configured to display video received from a remote communication device of a communication partner;
   a spatially-diverse microphone array including a plurality of microphones;
   an audio communication interface configured to transmit, to the remote communication device of the communication partner, an audio stream including real-world sounds produced by one or more real-world audio sources captured by the spatially-diverse microphone array and virtual sounds produced by one or more virtual audio sources; and
   an audio filter configured to selectively reduce a relative volume of background sounds in the audio stream based, at least in part, on real-world positioning of corresponding audio sources.

2. The conferencing system of claim 1, wherein the audio filter is configured to selectively reduce the relative volume of background virtual sounds in the audio stream based, at least in part, on virtualized real-world positioning of the one or more virtual audio sources.

3. The conferencing system of claim 2, wherein the virtualized real-world positioning of the one or more virtual audio sources are mapped to a physical space.

4. The conferencing system of claim 1, wherein the audio filter is configured to selectively reduce the relative volume of background virtual sounds in the audio stream based, at least in part, on an observed real-world positioning of the one or more real-world audio sources.

5. The conferencing system of claim 4, wherein the observed real-world positioning of the one or more real-world audio sources is identified using receive-beamforming of the real-world sounds captured by each of the plurality of microphones having spatially diverse positioning within a physical space.

6. The conferencing system of claim 1, wherein responsive to user selection of a first filter mode, a sound is included within the background sounds; and
   wherein responsive to user selection of a second filter mode, the sound is excluded from the background sounds.

7. The conferencing system of claim 1, wherein an audio source is individually selectable for volume reduction relative to other audio sources.

8. The conferencing system of claim 1, wherein a sound is included within the background sounds if a real-world positioning of a corresponding audio source is not within a three-dimensional audio-inclusion region; and
   wherein the sound is excluded from the background sounds if the real-world positioning of the corresponding audio source is within the three-dimensional audio-inclusion region.

9. The conferencing system of claim 8, wherein the three-dimensional audio-inclusion region is based on a field of view or gaze axis of the near-eye display device.

10. The conferencing system of claim 8, wherein the three-dimensional audio-inclusion region is user-defined.

11. The conferencing system of claim 1, wherein a sound is included within the background sounds if a real-world positioning of a corresponding audio source is within a three-dimensional audio-exclusion region; and
    wherein the sound is excluded from the background sounds if the real-world positioning of the corresponding audio source is not within the three-dimensional audio-exclusion region.

12. The conferencing system of claim 11, wherein the three-dimensional audio-exclusion region is based on a field of view or gaze axis of the near-eye display device.

13. The conferencing system of claim 11, wherein the three-dimensional audio-exclusion region is user-defined.

14. The conferencing system of claim 1, wherein the near-eye display device is configured to display a graphical indicator overlaying a real-world view of a physical space and identifying an audio source selected for volume reduction.

15. The conferencing system of claim 1, wherein the near-eye display device is configured to display a graphical indicator overlaying a real-world view of a physical space and identifying a real-world positioning of an audio source.

16. A conferencing method, comprising:
    capturing, via a plurality of microphones of a spatially-diverse microphone array, real-world sounds produced by one or more real-world audio sources having real-world positioning within a physical environment;
    combining the real-world sounds and virtual sounds into an audio stream, the virtual sounds produced by one or more virtual audio sources having virtualized real-world positioning within the physical environment;
    displaying a virtual object via an augmented reality display device, the virtual object representing the virtual audio source at a corresponding virtualized real-world positioning;
    selectively filtering the virtual sounds from the audio stream based on the virtualized real-world positioning of the one or more virtual audio sources; and
    transmitting the audio stream to a remote communication device of a communication partner.

17. The conferencing method of claim 16, further comprising:
    selectively filtering the real-world sounds from the audio stream based on observed real-world positioning of the one or more real-world audio sources.

18. The conferencing method of claim 17, further comprising:
    receiving a user selection from the remote communication device over a communication network;

filtering from the audio stream, an audio source selected from among the plurality of real-world audio sources and the virtual audio source responsive to the user selection.

19. A conferencing system, comprising:
a spatially-diverse microphone array including a plurality of microphones;
an audio communication interface configured to transmit, to a remote communication device of a communication partner, an audio stream including real-world sounds produced by one or more real-world audio sources captured by the spatially-diverse microphone array and virtual sounds produced by one or more virtual audio sources having virtualized real-world positioning;
an audio filter configured to selectively amplify or dampen a relative volume of one or more of the real-world sounds and the virtual sounds within the audio stream; and
an augmented reality display device configured to display, within an augmented reality view of a physical space, video received from a remote communication device of the communication partner, and to display graphical indicators identifying observed real-world positioning of the one or more real-world audio sources and the virtualized real-world positioning of the one or more virtual audio sources.

20. The conferencing system of claim 19, wherein the relative volume of one or more of the real-world sounds and the virtual sounds within the audio stream is selectively amplified or dampened responsive to user input directed at the one or more graphical indicators.

\* \* \* \* \*